Oct. 22, 1940.   W. B. A. COOPER   2,218,948
PLOW ATTACHMENT FOR TRACTORS
Filed March 25, 1940   3 Sheets-Sheet 3
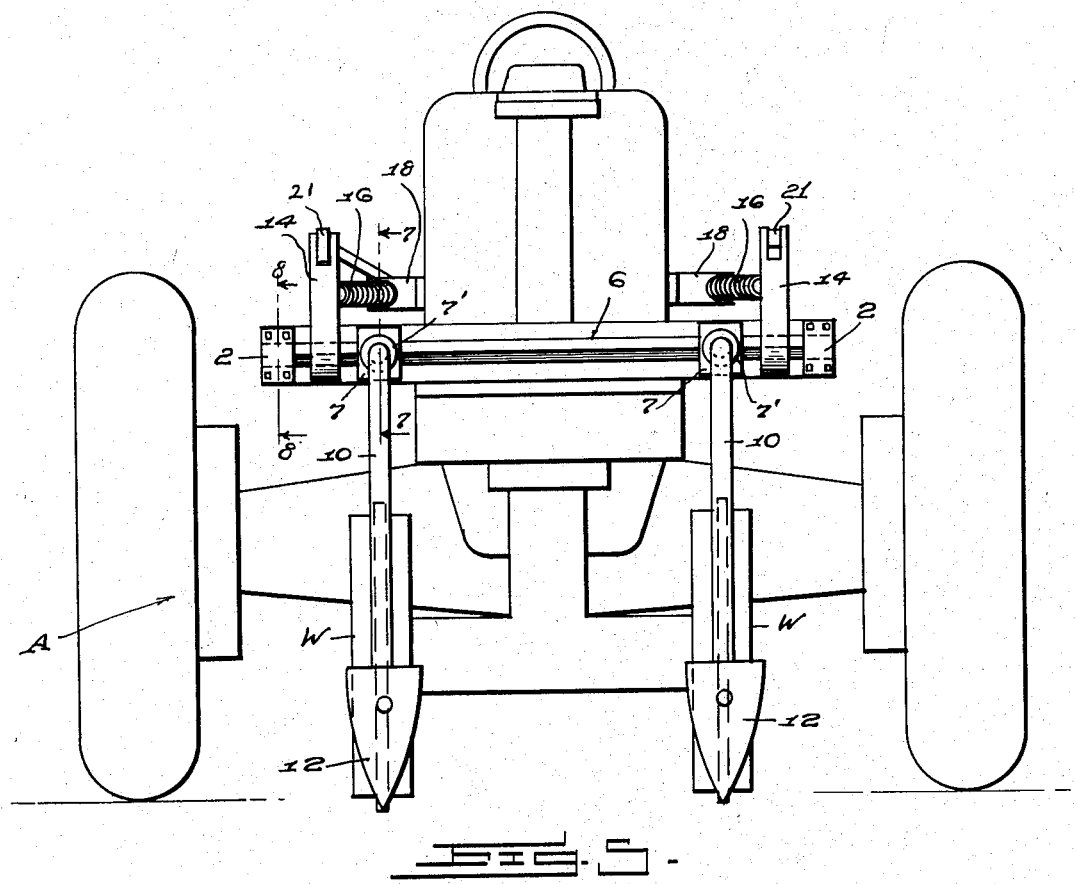
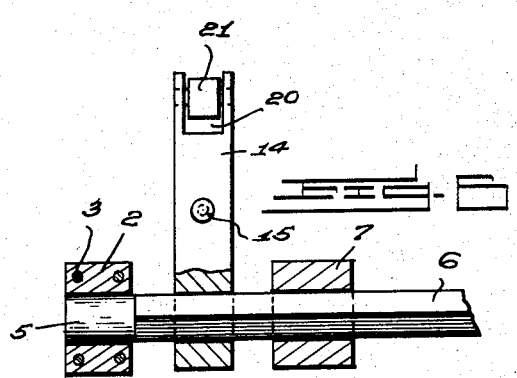
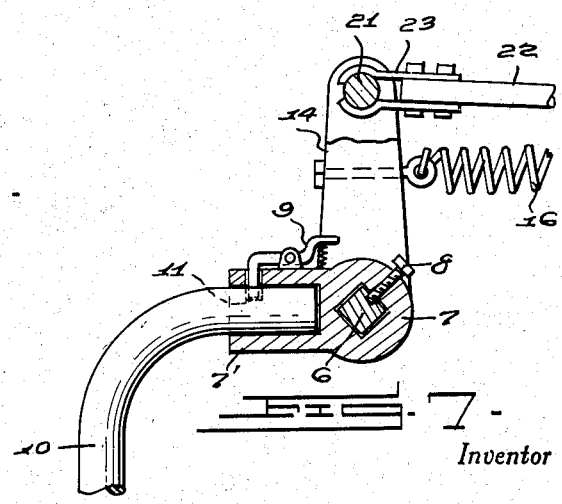
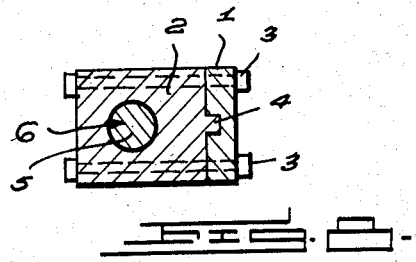
Inventor
WILLIAM BUCKNER A. COOPER,
By Clarence A. O'Brien
Attorney Patented Oct. 22, 1940

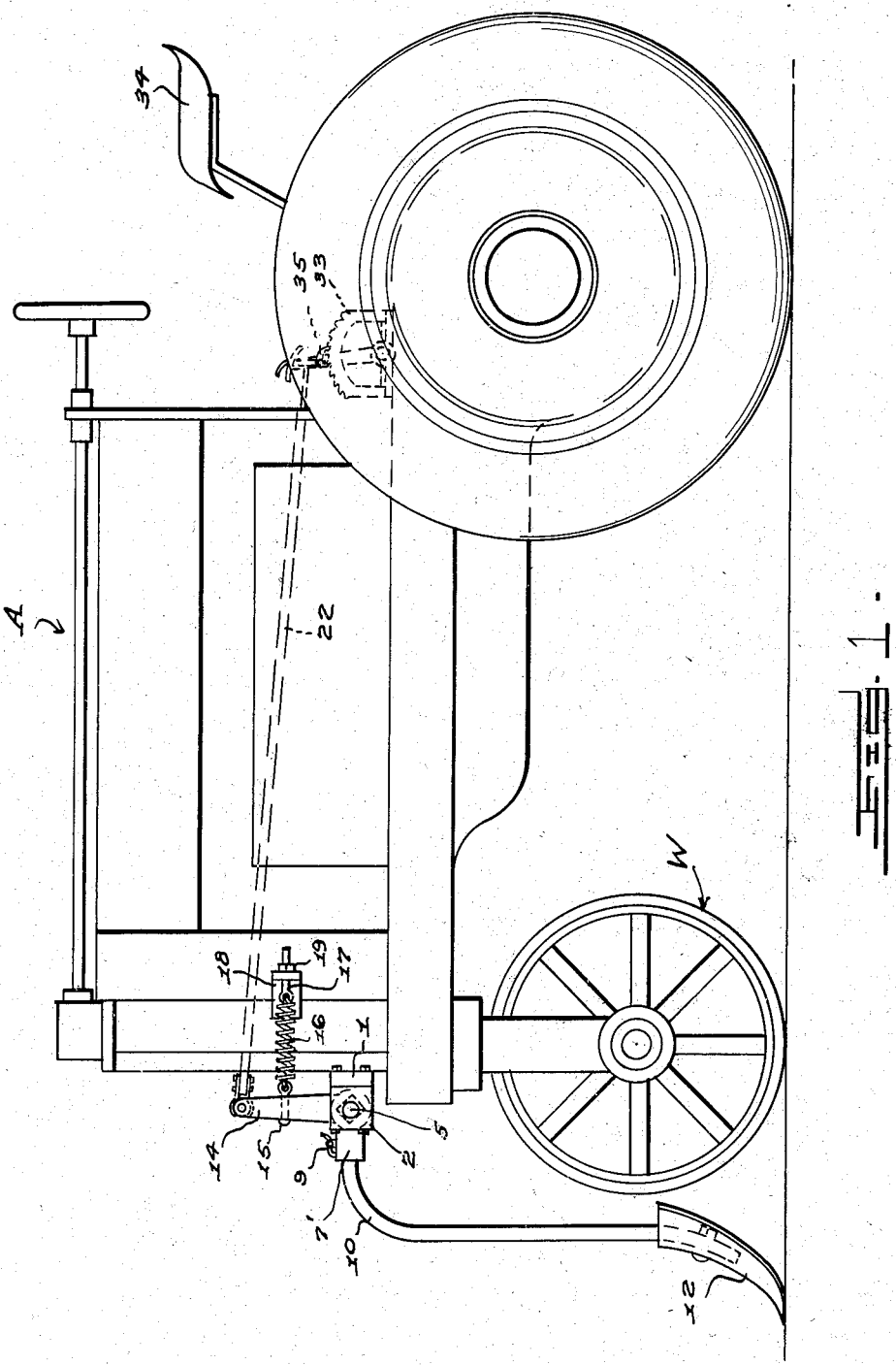

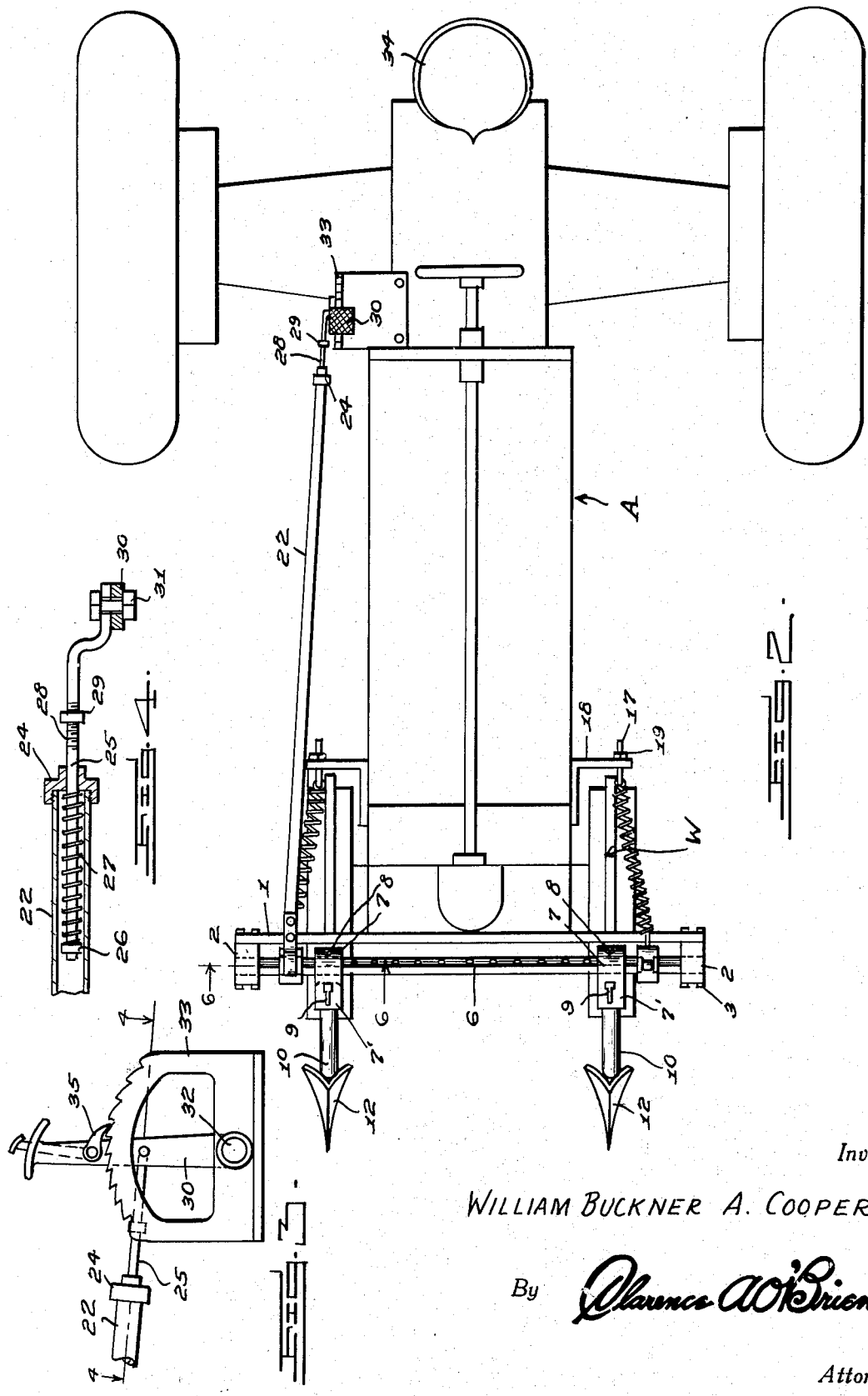

2,218,948

UNITED STATES PATENT OFFICE 2,218,948

PLOW ATTACHMENT FOR TRACTORS

William Buckner A. Cooper, Canistota, S. Dak.

Application March 25, 1940, Serial No. 325,859

4 Claims. (Cl. 97—47)

This invention relates to a plow attachment for tractors, the general object of the invention being to provide means for making furrows ahead of the front wheels of the tractor so that the wheels will run in said furrows and thus make the tractor more comfortable for the operator and to facilitate steering of the tractor.

Another object of the invention is to provide means whereby the operator can readily raise and lower the plows and can adjust the plows to suit the wheels and also to permit one plow to be removed when the attachment is used on a tractor having but one front wheel.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation of a tractor with the invention thereon.

Figure 2 is a top plan view of Figure 1.

Figure 3 is a detail elevational view of the manually controlled means for raising and lowering the plows.

Figure 4 is a section on the line 4—4 of Figure 3.

Figure 5 is a front view of Figure 1.

Figure 6 is a section on the line 6—6 of Figure 2.

Figure 7 is a section on the line 7—7 of Figure 5.

Figure 8 is a section on the line 8—8 of Figure 5.

In these drawings the letter A indicates a tractor of any suitable type and which is used for cultivating land and to which the cultivating means are attached in any suitable manner. In carrying out my invention I provide a cross bar 1 which is suitably attached to the front of the tractor in horizontal position with its ends extending beyond the sides of the tractor and a bearing block 2 is bolted to each end of the bar 1 by four bolts 3 and the rear of each block has a tongue 4 thereon fitting in a groove in the bar 1. These bearing blocks have journal openings therein of circular shape in cross section to receive the rounded ends 5 of a shaft 6 which is of square shape in cross section so that the shaft is rotatably supported by the bearing blocks. A pair of sleeves 7 is adjustably secured to the shaft 6 by each sleeve having a square bore through which the shaft passes with a set screw 8 fastening the sleeve in adjusted position on the shaft. Each sleeve is provided with a forwardly extending socketed part 7′ and a spring latch member 9 is pivoted to the top part of the part 7′. A shank 10 has a curved upper portion to make its extremity extend horizontally and this extremity fits in the socket member 7′ and it has a keeper recess 11 therein for receiving the latch member 9 which passes through a hole in the socketed part. The major portion of each shank extends downwardly in a vertical position and a plow or shovel 12 is detachably secured to the lower end of each shank. The sleeves 7 are to be adjusted on the shaft 6 so that the plows 12 will come in front of the front wheels W of the tractor so that the furrows made by these plows will form tracks for the front wheels. If the attachment is used on a tractor having but one front wheel then one of the shanks 10 is removed by releasing the latch 9 and then the other sleeve is adjusted to place the plow carried thereby directly in front of said single wheel to make a furrow to be entered by the wheel.

An upright 14 is carried by each end portion of the shaft 6 and an eye bolt 15 passes through an intermediate part of each upright and has a spring 16 connected therewith, the spring also being connected to an eye bolt 17 carried by a bracket 18 attached to a side part of the tractor, the eye bolt being adjusted by means of a nut 19 to regulate the tension of each spring 16. As will be seen these springs 16 tend to move the shaft 6 in a direction to lift the plows upwardly and forwardly.

The upper end of each member 14 is formed with a notch 20 in which is rotatably supported a small roller 21. A rod 22 has the clamping plates 23 connected to its forward end and these plates are to be engaged with either on of the rollers 21 according to which side the operating means are to be placed. The rod 22 extends rearwardly and is of tubular construction as shown in Figure 4 with a cap 24 attached to its rear end. A long rod 25 passes through the cap and has a nut 26 threaded on its front end and a coil spring 27 is placed on the rod and bears against the nut 26 and the cap 24. A part of the rod 25 rearwardly of the cap 24 is formed with the threads 28 to receive a nut 29 and the offset rear end of the rod is connected to a pedal 30 by a pivot bolt 31 the pedal being pivoted as at 32 to the quadrant 33 attached to a rear part of the tractor in a position where the driver occupying the seat 34 can place his foot on the pedal. The usual latch means 35 is fastened to the pedal and cooperates with the toothed part of the quadrant to hold the pedal in adjusted position.

As before stated, the springs 16 tend to hold the parts in a position with the shovels in raised position and out of the ground but when the operator wishes to cause the shovels or plows to engage the ground then he pushes forward the pedal 30 which causes the nut 29 to engage the cap 24 and pushes the rod 22 forwardly which, in turn, causes the upright 14 to which it is connected to partly rotate the shaft 6 in a direction to cause the shaft to engage the shovels or plows 12 with the ground. The pedal is fastened in its forward position by the latch 35 and thus the shovels will be engaging the ground during forward travel of the tractor until the pedal is released by moving of the latch 35 to inoperative position by the foot. Then the springs 16 will raise the shovels out of the ground, the spring 27 simply acting as a shock absorbing spring for the foot operated part.

As before stated the shovels can be adjusted so that they will make furrows directly in front of the front wheels or one shovel can be removed when a single wheel is used on the tractor and this shovel adjusted so that it will make a furrow for said single wheel. By having the wheels running in the furrows the tractor is more easily steered and it will run more smoothly and do a more efficient job of cultivation than where the front wheels run on uneven ground and on top of the ground.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. An attachment for a tractor comprising a tractor comprising a shaft supported for rocking movement in front of the tractor, sleeves slidably arranged on the shaft, means for fastening the sleeves in adjusted position on the shaft, each sleeve having a forwardly extending socketed part, shovel carrying shanks having their upper ends extending rearwardly and horizontally and entering the sockets, latch means for holding said ends of the shanks in the sockets, an arm extending upwardly from the shaft and manually operated means connected with the arm for rocking the shaft.

2. An attachment for a tractor comprising a shaft supported for rocking movement in front of the tractor, sleeves slidably arranged on the shaft, means for fastening the sleeves in adjusted position on the shaft, each sleeve having a forwardly extending socketed part, shovel carrying shanks having their upper ends extending rearwardly and horizontally and entering the sockets, latch means for holding said ends of the shanks in the sockets, an arm extending upwardly from the shaft and manually operated means connected with the arm for rocking the shaft, and spring means connected with the arm for normally holding the parts with the shovels out of the ground.

3. An attachment for a tractor comprising a bar extending across the front of the tractor, bearing blocks connected with the ends of the bar, a shaft having rounded ends journaled in said blocks, the rest of the shank being of non-circular shape in cross section, sleeves having non-circular bores through which the shaft passes, means for fastening the sleeves in adjusted position on the shaft, each sleeve having a forwardly extending socketed part, plow carrying shanks having horizontal upper ends for engaging the sockets in said parts, latch means for holding the said ends in said sockets, upwardly extending arms connected with the shaft, spring means connecting the arms with parts of the tractor for holding the parts with the plows out of the ground, a pedal adjacent the driver's seat of the tractor and linkage connecting the pedal with one of the arms for causing a forward movement of the pedal to move the parts to a position to cause the plows to enter the ground.

4. An attachment for a tractor comprising a bar extending across the front of the tractor, bearing blocks connected with the ends of the bar, a shaft having rounded ends journaled in said blocks, the rest of the shank being of non-circular shape in cross section, sleeves having non-circular bores through which the shank passes, means for fastening the sleeves in adjusted position on the shaft, each sleeve having a forwardly extending socketed part, plow carrying shanks having horizontal upper ends for engaging the sockets in said parts, latch means for holding the said ends in said sockets, upwardly extending arms connected with the shaft, spring means connecting the arms with parts of the tractor for holding the parts with the plows out of the ground, a pedal adjacent the driver's seat of the tractor and linkage connecting the pedal with one of the arms for causing a forward movement of the pedal to move the parts to a position to cause the plows to enter the ground, said linkage including a tubular part, a rod connected with the pedal and entering the tubular part for sliding movement and a nut adjustable on the rod for engaging the tubular part when the pedal is moved forwardly.

WILLIAM BUCKNER A. COOPER.